United States Patent
Byun

(10) Patent No.: US 8,658,296 B2
(45) Date of Patent: Feb. 25, 2014

(54) RECHARGEABLE BATTERY

(75) Inventor: Sang-Won Byun, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 652 days.

(21) Appl. No.: 12/659,110

(22) Filed: Feb. 25, 2010

(65) Prior Publication Data

US 2011/0206957 A1  Aug. 25, 2011

(51) Int. Cl.
*H01M 10/42* (2006.01)
*H01M 10/52* (2006.01)
*H01M 2/12* (2006.01)

(52) U.S. Cl.
USPC ............ 429/53; 429/56; 429/57; 429/163; 429/175

(58) Field of Classification Search
CPC ........................................ H01M 2/12
USPC .......... 429/53, 185, 181, 175, 56, 178, 82, 89
See application file for complete search history.

(56) References Cited

U.S. PATENT DOCUMENTS

| | | | | |
|---|---|---|---|---|
| 1,852,558 A | * | 4/1932 | Dunzweiler | 429/85 |
| 2,204,088 A | * | 6/1940 | Kugler | 429/79 |
| 3,398,026 A | * | 8/1968 | Andre | 429/54 |
| 6,265,097 B1 | | 7/2001 | Konno et al. | |
| 6,562,508 B1 | | 5/2003 | Satoh et al. | |
| 6,589,687 B1 | | 7/2003 | Konno et al. | |
| 2005/0287422 A1 | | 12/2005 | Kim et al. | |
| 2010/0233520 A1 | * | 9/2010 | Suzuki et al. | 429/56 |

FOREIGN PATENT DOCUMENTS

| | | | |
|---|---|---|---|
| EP | 2 104 159 A1 | 9/2009 | |
| JP | 09-139196 A | 5/1997 | |
| JP | 2003-187760 A | 7/2003 | |
| JP | 2003-208882 * | 7/2003 | H01M 2/12 |
| JP | 2005-032477 A | 2/2005 | |
| JP | 2006-351234 A | 12/2006 | |
| KR | 10-2004-0099525 A | 12/2004 | |
| KR | 10-2009-0081174 A | 7/2009 | |

OTHER PUBLICATIONS

Machine Translation of Kim (KR10-2009-0081174), Published Jul. 28, 2009.*
Machine Translation of Koichi et al. (JP 2003-208882, published Jul. 2003, pp. 1-9).*
European Office Action dated Nov. 7, 2011.
European Office Action in EP 10174076.9-1227, dated Nov. 10, 2010 (Byun).

* cited by examiner

*Primary Examiner* — Basia Ridley
*Assistant Examiner* — Caitlin Wilmot
(74) *Attorney, Agent, or Firm* — Lee & Morse, P.C.

(57) ABSTRACT

A rechargeable battery includes a battery case surrounding an electrode assembly. The battery case may include a cap plate having a vent hole, the cap plate being attached to the battery case, a vent plate disposed over and covering the vent hole, and a member protruding from an area of the cap plate surrounding the vent hole, the vent plate being on the member.

20 Claims, 6 Drawing Sheets

RECHARGEABLE BATTERY

BACKGROUND

1. Field

The described technology relates to a rechargeable battery. More particularly, it relates to a rechargeable battery having a vent plate that is installed in a cap plate and broken when internal pressure of a case is increased.

2. Description of the Related Art

A rechargeable battery, i.e., a secondary battery, may be repeatedly charged and discharged. For example, low-capacity rechargeable batteries may be used for portable compact electronic apparatuses, e.g., mobile phones, notebook computers, and camcorders, while high-capacity rechargeable batteries may be used, e.g., as a power source for driving a motor of a hybrid vehicle, etc.

SUMMARY

Embodiments are therefore directed to a rechargeable battery, which substantially overcome one or more of the problems due to the limitations and disadvantages of the related art.

It is therefore a feature of an embodiment to provide a rechargeable battery that includes a cap plate and a vent plate on a member protruding from the cap plate.

At least one of the above and other features and advantages may be realized by providing a rechargeable battery that includes a battery case surrounding an electrode assembly, a cap plate having a vent hole, the cap plate being attached to the battery case, a vent plate disposed over and covering the vent hole, and a member protruding from an area of the cap plate surrounding the vent hole, the vent plate being on the member. The member may include a first portion protruding from the area of the cap plate surrounding the vent hole having a first thickness, and a second portion protruding from the first portion, the second portion having a second thickness. The first thickness may be greater than the second thickness.

The vent plate may be disposed on the first portion of the member. The vent plate may be disposed on the second portion of the member. The first portion and the second portion of the member may form a stepped portion along an inner side of the member, and the vent plate may be disposed in the stepped portion. The first portion and the second portion may form a continuous surface surrounding the vent hole, and the first portion and second portion may form a stepped portion along an outer side of the member. The vent plate may cover at least a portion of a lateral side of the second portion. The vent plate may be in direct contact with the second portion.

The member may be a continuous frame that protrudes from the cap plate and surrounds the vent hole. The vent plate covers the continuous frame. The member may have a third thickness, the cap plate may have a fourth thickness, and the third thickness may be greater than the fourth thickness.

The may include member a first portion protruding from the area of the cap plate surrounding the vent hole, the first portion having a first inner circumference and a first outer circumference, and a second portion protruding from the first portion, the second portion having a second inner circumference and a second outer circumference. The first inner circumference may be smaller than the second inner circumference, and the first outer circumference and second outer circumference may be approximately equal. The vent plate may be disposed on the first portion of the member.

The member may include a first portion protruding from the area of the cap plate surrounding the vent hole, the first portion having a first inner circumference and a first outer circumference, and a second portion protruding from the first portion, the second portion having a second inner circumference and a second outer circumference. The first outer circumference may be greater than the second outer circumference, and the first inner circumference and second inner circumference may be approximately equal. The vent plate may be disposed covering the second portion, and at least a partial portion of a lateral side of the second portion.

The member may be a continuous frame that protrudes from the first or second surface of the cap plate and surrounds the vent hole, the continuous frame having a first inner circumference and a first outer circumference, and the vent plate covers the continuous frame extending between the first inner circumference and the first outer circumference.

The vent plate may include a notch. The notch may expose the vent hole when an internal pressure of the rechargeable battery is higher than a threshold pressure.

The member may support the vent plate. The vent plate may expose the vent hole when an internal pressure of the rechargeable battery is higher than a threshold pressure.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION

Figure 1:
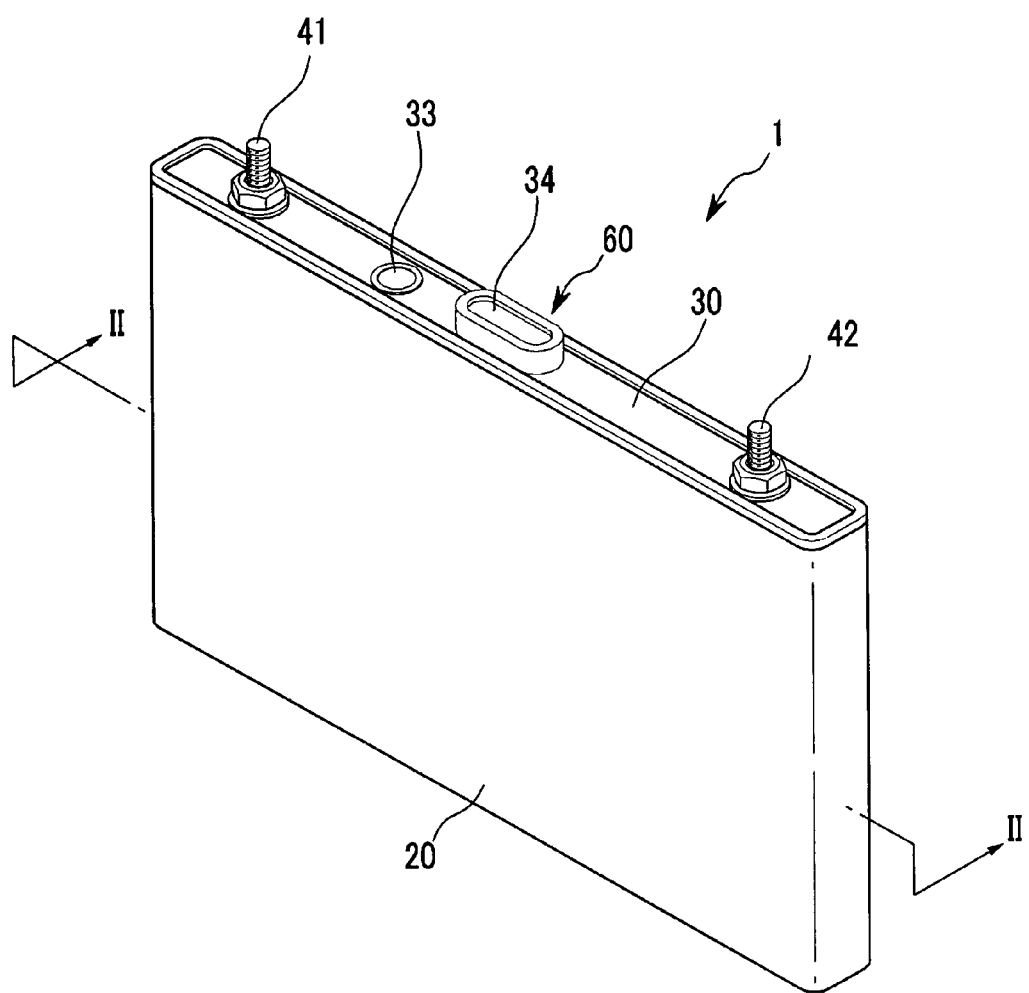
FIG. 1 illustrates a perspective view of a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

A rechargeable battery module may be formed by coupling a plurality of rechargeable battery units in series. Each rechargeable battery unit in the battery module may include an electrode assembly having a positive electrode, a separator, and a negative electrode, a case in which the electrode assembly is installed, a cap plate coupled to the case to seal an opening of the case, and an electrode terminal extending through the cap plate and electrically connected to the electrode assembly.

Each rechargeable battery unit, i.e., rechargeable battery, may generate internal gas as a result of repeated charging and discharging processes. Consequently, internal pressure due to the generated internal gas within the rechargeable battery may be increased, which may cause a swelling phenomenon. To minimize adverse effects, e.g., explosion of the rechargeable battery unit, associated with the swelling phenomenon, the cap plate may include a vent hole and a vent plate. The vent hole may be formed as a penetration structure, i.e., through-hole, in the cap plate in order to emit the internal gas, i.e. release the internal pressure, of the rechargeable battery therethrough.

During normal operation, i.e., when the internal pressure of the rechargeable battery is below or equal to a threshold pressure, the vent plate seals the vent hole. For example, the vent plate may be adhered directly to the cap plate around the vent hole during normal operation. However, when the internal pressure is greater than the threshold pressure, the vent plate may be broken, thereby, opening, i.e., exposing, the vent hole.

Many factors may have an effect on the normal operation of the vent plate. For example, the cap plate may be deformed due a welding process and/or due to internal pressure of the rechargeable battery unit and/or module. Deformation of the cap plate may change an operation pressure, i.e., threshold pressure or a predetermined internal pressure range, of the vent plate. As such, the vent plate may not operate within the operation pressure. For example, the vent plate may break at an internal pressure below the threshold pressure causing the vent hole to be prematurely exposed, or the vent plate may not break at the threshold pressure causing an explosion of the battery unit. It is a feature of the embodiments discussed herein to provide a vent plate that may operate at the threshold pressure even if the cap plate is deformed.

Deformation of the vent plate may also have an effect on the normal operation of the vent plate. For example, the vent plate may be thermally deformed when the vent plate is welded to the vent hole or the vent plate may be physically deformed when the cap plate is deformed due to an external force, e.g., a force applied to the case of the rechargeable battery. It is another feature of the embodiments discussed herein to minimize deformation of the vent plate.

Figure 2:
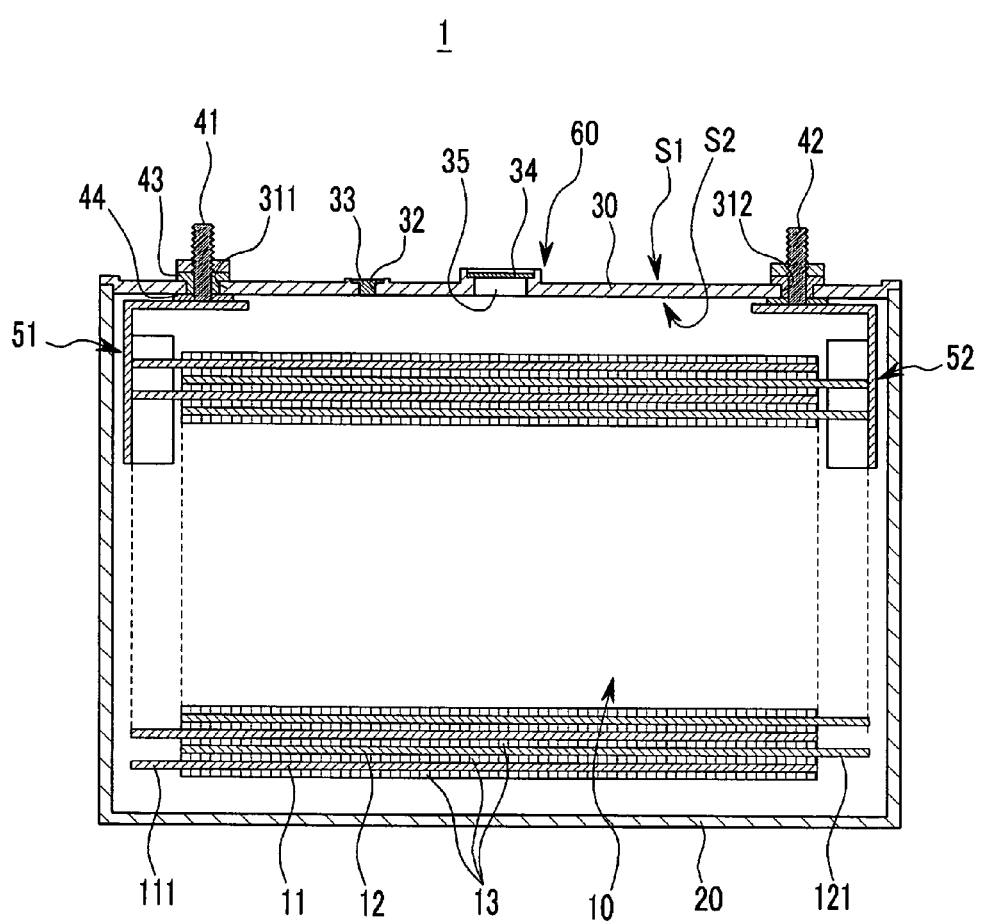
FIG. 2 illustrates a cross-sectional view of the rechargeable battery of FIG. 1 taken along line II-II.

FIG. 1 illustrates a perspective view of a rechargeable battery 1 according to an exemplary embodiment, and FIG. 2 illustrates a cross-sectional view of the rechargeable battery 1 of FIG. 1 taken along the line II-II.

Referring to FIGS. 1 and 2, a rechargeable battery 1 may include a case 20 in which an electrode assembly 10 is installed. The case 20 may include an opening formed in one side, and a cap plate 30 may seal and close the opening in the case 20. The cap plate 30 may include terminal holes 311 and 312, and terminal electrodes 41 and 42 may extend through respective terminal holes 311 and 312. The electrode terminals 41 and 42 may be electrically connected to the electrode assembly 10 through respective lead tabs 51 and 52. Lead tabs 51 and 52 may be electrically connected to the electrode assembly 10.

The electrode assembly 10 may include a separator 13, i.e., an insulator, a positive electrode 11, and a negative electrode 12. The positive and negative electrodes 11 and 12 may be disposed on opposite sides of the separator 13 forming a structure, and the structure may be spirally wound into a jelly roll shape.

The positive and/or negative electrodes 11, 12 may include a current collector formed of a thin metal foil and an active material coated on a surface of the current collector. The positive electrode 11 and/or the negative electrode 12 may include a coated region where a current collector is coated with the active material and respective uncoated regions 111 and 121 where the current collector is not coated with the active material.

The coated regions may occupy almost an entire surface area of the positive electrode 11 and the negative electrode 12. The uncoated regions 111 and 121 in the jelly roll shape may be disposed at both sides of the coated regions on the positive electrode 11 and/or negative electrode 12, as illustrated in FIG. 2. In an exemplary embodiment, the electrode assembly 10 may form wide front rear areas in the jelly roll form, e.g., the electrode assembly may have a first length along opposing front and rear areas and a second length along opposing side areas, the first length being greater than the second length. End portions of the uncoated regions 111 and 121 may be formed in a shape that substantially corresponds to a cuboid, e.g., having narrow and long surface areas. End portions along the left and right sides of the uncoated regions 111 and 121 may be electrically connected to respective lead tabs 51 and 52.

The case 20 may form an exterior of the rechargeable battery 1, and the case 20 may be formed of a conductive metal such as aluminum, an aluminum alloy, a nickel-plated steel, or the like. The case 20 may provide a space for installing the electrode assembly 10 therein. The case 20 may have any shape appropriate for enclosing the jelly roll form, e.g., a hexahedron shape, and the case 20 may include an opening in one side for receiving the electrode assembly 10. The opening in the case 20 may face upward, as illustrated in FIG. 1 and FIG. 2. The jelly roll form and the case 20 may both have a hexahedron-like shape, such that the jelly roll fits inside the case 20.

The cap plate 30 may be a thin plate that is combined to the opening in case 20 to close the opening. Thus, the cap plate 30 may close and seal the case 20. The cap plate 30 may connect components inside the case 20 to components outside the case 20 as necessary while also blocking the inside from the outside of the case 20.

The cap plate 30 may include elements for forming and operating the rechargeable battery 1. For example, the cap plate 30 may include terminal holes 311 and 312 through which respective electrode terminals 41 and 42 extend from the inside to the outside of the case 20, an electrolyte injection opening 32 for the injection of electrolyte solution, and a vent hole 35 that may promote safety in the circumstance when an internal pressure inside the rechargeable battery 1 is increased to a threshold pressure of the battery 1.

The terminal holes 311 and 312 penetrate the cap plate 30, e.g., may be through holes, so as to enable insertion of the electrode terminals 41 and 42. The electrode terminals 41 and 42 may draw out the respective positive electrode 11 and negative electrode 12 of the electrode assembly 10 through the terminal holes 311 and 312.

The electrode terminals 41 and 42 may be electrically connected to the electrode assembly 10 inside the case 20, extend through the respective terminal holes 311 and 312, and protrude outside the case 20. The electrode terminal 41 may be a positive electrode terminal 41 connected to the positive electrode 11, and the electrode terminal 42 may be a negative electrode terminal 42 connected to the negative electrode 12.

The electrode terminals 41 and 42 may be installed through the respective terminal holes 311 and 312 by providing an outer insulator 43 and an inner insulator 44. The outer insulator 43 and the inner insulator 44 may form an electrical insulation structure between the electrode terminals 41 and 42 and the cap plate 30. The positive electrode terminal 41 and the negative electrode terminal 42 may each include respective terminal holes 311 and 312, the inner insulator 44, and the outer insulator 43 formed in the same structure. As such, for explanatory purposes only, the terminal hole 311, the inner insulator 44, and the outer insulator 43 formed in the positive electrode terminal 41 will be described. However, the description similarly applies to the negative electrode terminal 42 and terminal hole 312.

As illustrated in FIG. 2, the cap plate 30 includes a first surface S1 that faces outside the case 20 and a second surface S2 that faces inside the case 20. The first surface S1 opposes the second surface S2. In an exemplary embodiment, the outer insulator 43 may be placed on the first surface S1 of the cap plate 30 and may be partially inserted in the terminal hole 311 to electrically insulate the positive electrode terminal 41 and the cap plate 30. That is, the outer insulator 43 may electrically insulate an external circumferential surface of the positive electrode terminal 41 and the first surface S1 of the cap plate 30, and at the same time, may electrically insulate the external circumferential surface of the positive electrode terminal 41 and an interior circumference of the terminal hole 311 that faces the external circumferential surface of the positive electrode terminal 41.

The inner insulator 44 may contact the second surface S2 of the cap plate 30, and may electrically insulate a portion of the cap plate 30 surrounding the terminal hole 311 and the lead tab 51 that faces the portion of the cap plate 30. That is, the inner insulator 44 may electrically insulate an upper surface of the lead tab 51 and the second surface S2 of the cap plate 30, and at the same time, may electrically insulate the external circumferential surface of the positive electrode terminal 41 and a portion of the cap plate 30 that faces the external circumference surface of the positive electrode terminal 41.

One end of both lead tabs 51 and 52 may be connected to the electrode terminals 41 and 42, and the other end of both lead tabs 51 and 52 may be connected to respective uncoated regions 111 and 121 formed at ends of electrode assembly 10. That is, the lead tabs 51 and 52 may be formed as a pair, and may respectively connect the positive electrode 11 and the negative electrode 12 to the positive electrode terminal 41 and the negative electrode terminal 42.

The electrolyte injection opening 32 in the cap plate 30 may enable injection of the electrolyte solution into the case 20. After the injection of the electrolyte solution into the case 20, the electrolyte injection opening 32 may be sealed by a sealing cap 33.

During normal operation of the rechargeable battery 1, the vent hole 35 is maintained in a closed state, e.g., the vent hole 35 is closed and sealed by a vent plate 34. The vent plate 34 may be opened when internal pressure inside the rechargeable battery 1 is increased to a threshold pressure. The vent plate 34 may be formed as a plate that is a thinner than the cap plate 30, and the vent plate 34 may be adhered around the vent hole 35 to cover the vent hole 35. When the internal pressure of the case 20 is increased, e.g., due to charging and discharging of the electrode assembly 10, beyond a predetermined level, i.e., the threshold pressure, the vent plate 34 should cut out and allow the internal gas of the rechargeable battery 1 to be emitted therethrough. Therefore, explosion of the rechargeable battery 1 may be prevented.

Referring to FIG. 2, the cap plate 30 according to an exemplary embodiment may include a member 60, e.g., a reinforcing member, formed protruding from an area on the first surface S1 of the cap 30 surrounding the vent hole 35. According to other exemplary embodiments, the member 60 may extend from at least one of the first and second surfaces S1 and S2 of the cap plate 30. For example, the member 60 may extend from the second surface S2 toward the electrode assembly 10, and the member 60 may extend from the second surface S2 toward the first surface S1. The member 60 may reinforce resistivity due to deformation, e.g., due to thermal deformation or external force on the cap plate 30 around the vent hole 35. For example, the member 60 may block or at least decrease deformation of the cap plate 30 and/or the vent plate 34.

The vent plate 34 may be adhered to, e.g., welded to, the member 60 while sealing the vent hole 35. By adhering the vent plate 34 to the member 60, e.g., deformation of the vent plate 34 may be minimized when the cap plate 30 is thermally deformed due to welding. Moreover, for example, deformation of the vent plate 34 may be minimized when the cap plate 30 is deformed due to an external force, e.g., a physical pressure applied while the battery 1 is being used. The member 60 welded to the vent plate 34 may decrease and block deformation progress, e.g., further deformation, of the cap plate 30. That is, deformation of the vent plate 34 due to other factors may be minimized, and the vent plate 34 may maintain the vent hole 35 in the closed state when the internal pressure is lower than the predetermined level, i.e., threshold pressure, and cut out when the internal pressure exceeds the predetermined level to emit internal gas to release internal pressure.

Figure 3:
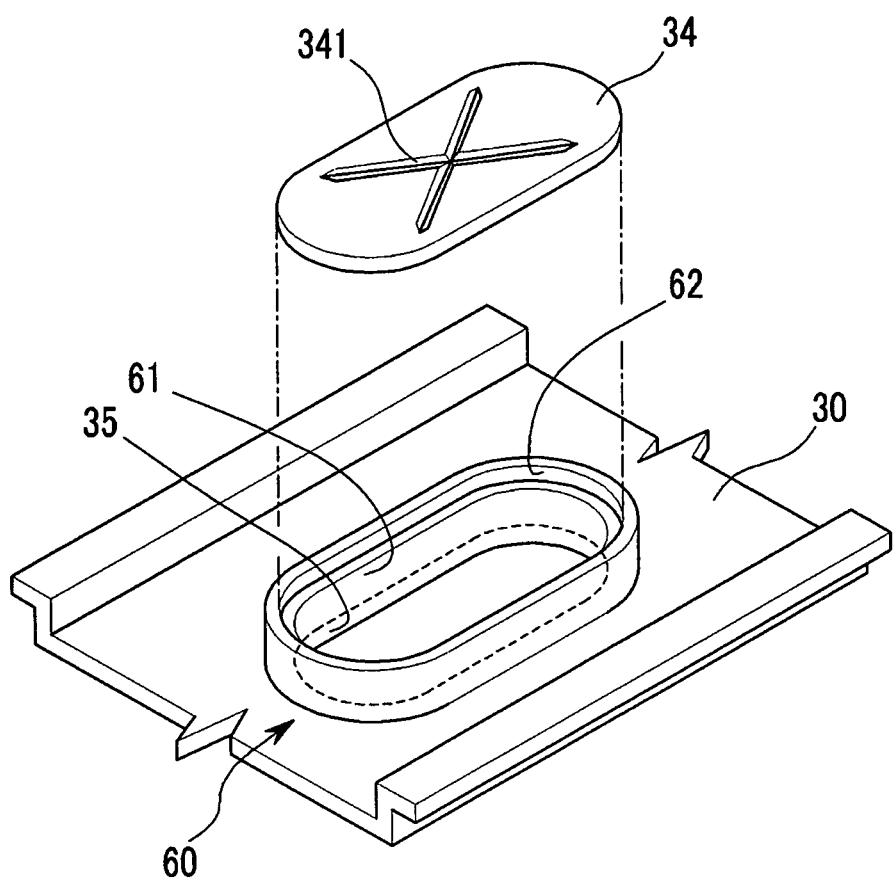
FIG. 3 illustrates an exploded perspective view of a cap plate and a vent plate.
Figure 4:
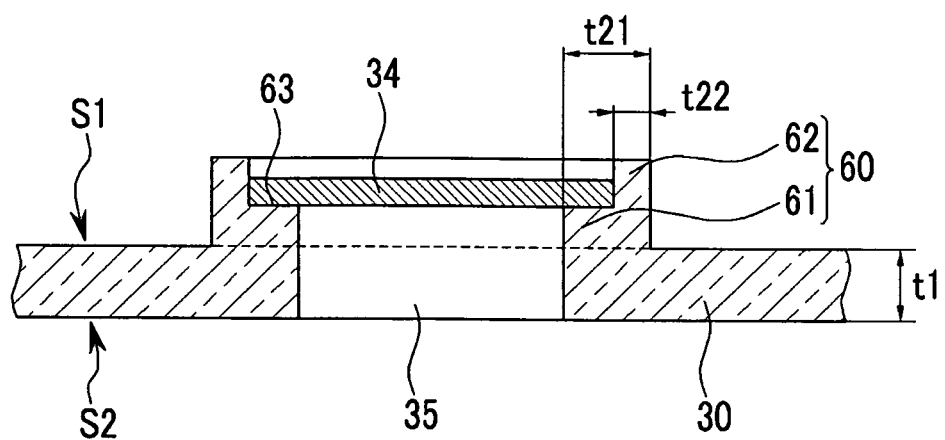
FIG. 4 illustrates a cross-sectional view of an adhesion state of the cap plate and the vent plate of FIG. 3.

FIG. 3 illustrates an exploded perspective view of the cap plate 30 and the vent plate 34, and FIG. 4 illustrates a cross-sectional view of an adhesion state of the cap plate 30 and the vent plate 34 of FIG. 3.

Referring to FIGS. 3 and 4, the member 60 may protrude away from the first surface S1 of the cap plate 30 and support the vent plate 34. The member 60 may include a first portion 61 extending from an area on the first surface S1 of the cap plate 30 surrounding the vent hole 35 and a second portion 62 extending from the first portion 61. The first portion 61 may form a hole overlapping that the vent hole 35 that is approximately the same size as the vent hole 35, and the second portion 62 may form a hole overlapping the vent hole 35 that is larger than the vent hole 35.

The first portion 61 and the second portion 62 may form a stair structure including a stepped portion 63. The stepped portion 63 may fix a location where the vent plate 34 is placed. For example, the vent plate 34 may be placed on the stepped portion 63 such that outer edges, e.g., outer circumference, of the vent plate 34 are in contact with a sidewall of the second portion 62.

A thickness of the member 60 may be set relative to a thickness of the cap plate 30. The cap plate 30 may have a cap thickness t1, the first portion 61 may have a first thickness t21, and the second portion 62 may have a second thickness t22. The first thickness t21 and the second thicknesses t22 may be measured in a direction that crosses, i.e., intersects, the measurement direction of the cap thickness t1. Outer edges, e.g., outer circumference or lateral edges, of the first portion 61 and the second portion 62 may be linearly formed, i.e., vertically aligned, in a direction of the first thickness t1. Inner edges, e.g., inner circumference, of the first portion 61 and the second portion 62 may not be linearly formed, such that stepped portion 63 is formed by the inner edges. The first thickness t1 may be greater than the second thickness t22.

The first thickness t21 of the first portion 61 may be larger than the cap thickness t1 of the cap plate 30. Accordingly to the exemplary embodiment discussed above, the first thickness t21 may be a maximum area for the member 60 with respect to the cap plate 30, and the resistivity to deformation of the cap plate 30 can be increased as the maximum area is increased. The first portion 61 may have a first inner circumference substantially surrounding the vent hole 35 and a first outer circumference, and the second portion 62 may have a second inner circumference substantially surrounding the vent hole 35 and a second outer circumference. The first inner circumference of the first portion 61 may be smaller than the second inner circumference, such that a stair structure in the member 60 is formed surrounding the vent hole 35. The first outer circumference and the second outer circumference may be approximately equal.

Inner edges, e.g., interior circumference, of the first portion 61 may form a hole that is equal to the vent hole 35, and inner edges, e.g., interior circumference, of the second portion 62 may form a hole that is larger than the vent hole 35. The inner edges may form the stair structure. The inner edges of the second end 62 may enable loose insertion of the vent plate 34, such that the hole formed by inner edges of the second portion 62 roughly corresponds to a parameter formed by outer edges of the vent plate 34. The hole formed by inner edges of the second portion 62 may be slightly larger than an area of the vent plate 34. A surface of the first portion 61 coupled to the second end 62, i.e., the resultant stepped portion 63, may induce contact with the vent plate 34, e.g., placed in a flat shape in the stepped portion 63, for tight adhesion therebetween so as to close and seal the vent hole 35.

Moreover, the inner edges of the second portion 62 may ease arrangement of and may fix a position for the vent plate 34. For example, in the case where the inner edges of the second portion 62 form the interior circumference of the second end 62, the vent plate 34 may be a circular vent plate and the resultant hole through the second portion 62 may be larger than the vent hole 35. Therefore, the vent plate 34 may have a circumference that is slightly less than the circumference of the resultant hole formed by the interior circumference of the second end 62, and the interior circumference of the second portion 62 may ease arrangement of and may fix a position for the circular vent plate 34.

Referring to FIGS. 3 and 4, vent plate 34 on the first and second portions 61, 62 extending from the first surface S1 may maintain the vent hole 35 in the closed state when the internal pressure is lower than the predetermined level, i.e., threshold pressure, and cut out when the internal pressure exceeds the predetermined level to emit internal gas of the rechargeable battery 1. Moreover, the first portion 61 and the second portion 62 may increase resistivity to the thermal deformation and deformation of the vent plate 34 and the cap plate 30 around the vent hole 35.

Referring the FIG. 3, the vent plate 34 may include a notch 341 having various structures, e.g., an X-shape, a cross shape, or an asterix type shape including multiple lines meeting at a center point, that may be cut out from the vent plate. As illustrated in FIG. 3, the notice 341 may cross through a center of the vent plate 34. The notch 341 may cut out of the vent plate 34, i.e., expose the vent hole 35, when the internal pressure exceeds the predetermined level. When the internal pressure is increased, the notch 341 may be cut out from the crossed center of the vent plate 34. When the notch 341 is cut out from the vent plate 34, the outer edges of the vent plate 34 may remain adhered to the member 60.

Hereinafter, another exemplary embodiment of the present inventions will be described. Parts that are the same as that of the first exemplary embodiment of the present invention will be omitted.

Figure 5:
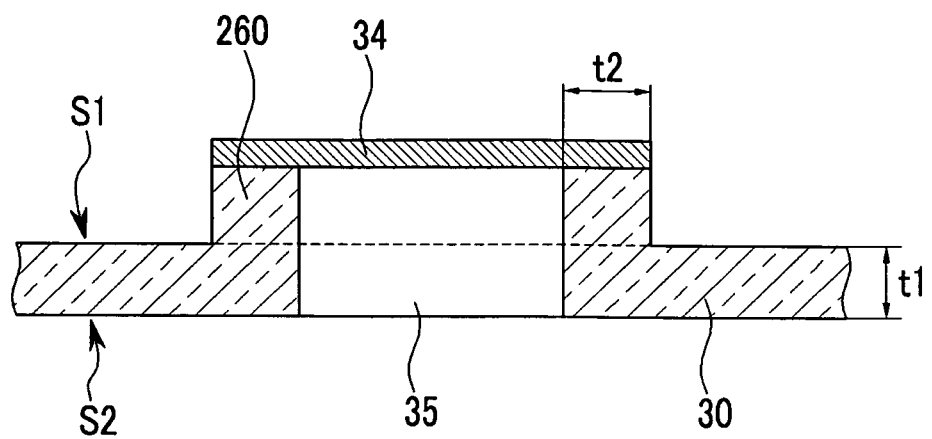
FIG. 5 illustrates a cross-sectional view of an adhesion state of a cap plate and a vent plate in a rechargeable battery according to another exemplary embodiment.

FIG. 5 illustrates a cross-sectional view of an adhesion state of a cap plate and a vent plate in a rechargeable battery according to another exemplary embodiment.

Referring to FIG. 5, a member 260, e.g., a reinforcing member, may be formed protruding from the first surface S1 of the cap plate 30, and the vent plate 34 may be adhered to a surface, e.g., top surface, of the member 260. The member 260 may have a frame structure protruding from the first surface S1. The member 260 may be a continuous frame substantially surrounding the vent hole 35. The member 260 may have a uniform thickness over substantially the entire frame structure.

A second thickness t2 of the member 260 may be formed to be larger than the cap thickness t1 of the cap plate 30. The member 260 having the second thickness t2 may increase resistivity to thermal deformation and deformation of the cap plate 30.

Referring to FIG. 5, the vent plate 34 may be adhered a top surface of the member 260 protruding from the first surface S1 of the cap plate 30. The vent plate 34 may extend across substantially an entire length of the top surface of the member 260. The vent plate 34 may also include the notch 341. The member 260 may maintain the vent hole 35 in the closed state when the internal pressure is lower than the predetermined level, i.e., threshold pressure, and cut out when the internal pressure exceeds the predetermined level to emit internal gas of the rechargeable battery 1. Moreover, member 260 may increase resistivity to the thermal deformation and deformation of the vent plate 34 and the cap plate 30 around the vent hole 35.

Figure 6:
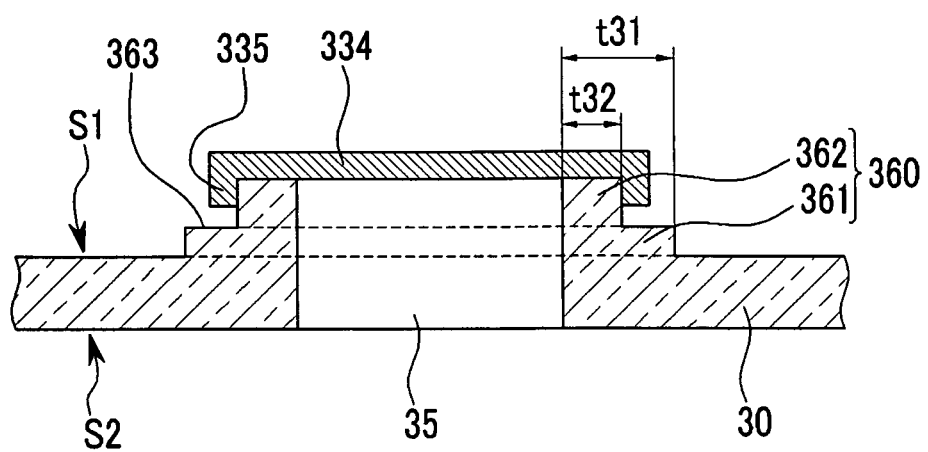
FIG. 6 illustrates a cross-sectional view of an adhesion state of a cap plate and a vent plate in a rechargeable battery according to another exemplary embodiment.

FIG. 6 illustrates a cross-sectional view of an adhesion state between the cap plate and a vent plate of a rechargeable battery according to another exemplary embodiment.

Referring to FIG. 6, a member 360. e.g., a reinforcing member, may be formed protruding from the first surface S1 of the cap plate 30, and a vent plate 334 may be adhered to at least one surface of the member 360. The member 360 may include a stair structure, which includes a stepped portion 363, formed at outer edges, e.g. outer circumference, by first portion 361 and second portion 362 of the member 360.

The first portion 361 of the member 360 may extend from an area of the cap plate 30 surrounding the vent hole 35, and the first portion may have a first thickness t31. The second portion 362 may extend from the first portion 361, and the second portion may have a second thickness t32. The second thickness t32 may be smaller than the first thickness t31, such that the stair structure is formed at the outer edges of the member 360.

The first portion 361 may have a first inner circumference surrounding the vent hole 35 and a first outer circumference, and the second portion 362 may have a second inner circumference surrounding the vent hole 35 and a second outer circumference. The first outer circumference of the first portion 361 may be greater than the second outer circumference of the second portion 362, such that the stair structure is formed along an outer circumference of the member 360. The first inner circumference may be approximately equal to the second inner circumference. The vent hole 35 and inner sidewalls, e.g., the first and second inner circumferences, of the first and second portions 361 and 362 may be linearly aligned.

The vent plate 334 may be adhered to a top surface of the member 360. The vent plate 334 may extend across substantially an entire length of the top surface of the member 260, and the vent plate 334 may include the notch 341. The vent plate 334 may include at least one protrusion 335 adhered to an outer sidewall of the second portion 362, e.g., a sidewall along the second outer circumference. For example, a plurality of protrusions 335 may extend from an outer edge, e.g., outer circumference, of the vent plate 334. The protrusion 335 may be formed in a frame structure over substantially the entire outer edge of the vent plate 334. The protrusions 335 may be a single continuous protrusion covering substantially the entire outer edge of the vent plate 334. Moreover, the at least one protrusion 335 may fix a location where the vent plate 334 is placed on the second portion 362 of the member 360.

Referring to FIG. 6, vent plate 334 on the first and second portions 361, 362 extending from the first surface S1 may maintain the vent hole 35 in the closed state when the internal pressure is lower than the predetermined level, i.e., threshold pressure, and cut out when the internal pressure exceeds the predetermined level to emit internal gas of the rechargeable battery 1. Moreover, the first portion 361 and the second portion 362 may increase resistivity to the thermal deformation and deformation of the vent plate and the cap plate 334 around the vent hole 35.

Disclosed is a rechargeable battery that may include a reinforcing member protruded from a surface around a vent hole of a cap plate, and the vent plate may be adhered to the member to minimize adverse effects, e.g., thermal deformation of the cap plate due to a welding process and deformation progress from the cap plate due to external force.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
    a battery case surrounding an electrode assembly;
    a cap plate having a vent hole, the cap plate being attached to the battery case;
    a vent plate disposed above and covering the vent hole, the vent plate exposing the vent hole when an internal pressure of the rechargeable battery is higher than a threshold pressure; and
    a member protruding from an area of the cap plate surrounding the vent hole, the vent plate being seated on a surface of the member, which surface of the member is above the cap plate, without the vent plate being directly coupled with any surface of the cap plate,
    wherein the member includes:
        a first portion protruding from the area of the cap plate surrounding the vent hole and having a first thickness; and
        a second portion protruding from the first portion, the second portion having a second thickness, the first thickness being greater than the second thickness and the first thickness and the second thickness being measured in a direction parallel with a plane of the surface of the member on which the vent plate is seated, and
    wherein:
        the member protrudes directly from the area of the cap plate, the area of the cap plate being an uppermost surface of the cap plate,
        the vent plate is directly coupled with the surface of the member, the surface of the member being substantially parallel to the cap plate, and
        the vent plate is above the uppermost surface of the cap plate and the electrode assembly is below the uppermost surface of the cap plate.

2. The rechargeable battery as claimed in claim 1, wherein the vent plate is disposed on the first portion of the member.

3. The rechargeable battery as claimed in claim 1, wherein the vent plate is disposed on the second portion of the member.

4. The rechargeable battery as claimed in claim 1, wherein the first portion and the second portion of the member form a stepped portion along an inner side of the member, an entirety of the stepped portion being above the cap plate and the vent plate being disposed in the stepped portion.

5. The rechargeable battery as claimed in claim 1, wherein the first portion and the second portion form a continuous surface surrounding the vent hole, and the first portion and second portion form a stepped portion along an outer side of the member.

6. The rechargeable battery as claimed in claim 5, wherein the vent plate covers at least a portion of a lateral side of the second portion.

7. The rechargeable battery as claimed in claim 5, wherein the vent plate is in direct contact with the second portion.

8. The rechargeable battery as claimed in claim 1, wherein the member is a continuous frame that protrudes from the cap plate and surrounds the vent hole.

9. The rechargeable battery as claimed in claim 8, wherein the vent plate covers the continuous frame.

10. The rechargeable battery as claimed in claim 8, wherein the member has a third thickness in the direction parallel with the plane of the surface of the member, the cap plate has a fourth thickness in a direction orthogonal with the plane of the surface of the member, and the third thickness is greater than the fourth thickness.

11. The rechargeable battery as claimed in claim 1, wherein the member includes:
    a first portion protruding from the area of the cap plate surrounding the vent hole, the first portion having a first inner circumference and a first outer circumference; and
    a second portion protruding from the first portion, the second portion having a second inner circumference and a second outer circumference, wherein:
    the first inner circumference is smaller than the second inner circumference, and the first outer circumference and second outer circumference are approximately equal.

12. The rechargeable battery as claimed in claim 11, wherein the vent plate is disposed on the first portion of the member.

13. The rechargeable battery as claimed in claim 1, wherein the member includes:
    a first portion protruding from the area of the cap plate surrounding the vent hole, the first portion having a first inner circumference and a first outer circumference; and
    a second portion protruding from the first portion, the second portion having a second inner circumference and a second outer circumference, wherein:
    the first outer circumference is greater than the second outer circumference, and the first inner circumference and second inner circumference are approximately equal.

14. The rechargeable battery as claimed in claim 13, wherein the vent plate is disposed covering the second portion, and at least a partial portion of a lateral side of the second portion.

15. The rechargeable battery as claimed in claim 1, wherein the member is a continuous frame that protrudes from the first or second surface of the cap plate and surrounds the vent hole, the continuous frame has a first inner circumference and a first outer circumference, and the vent plate covers the continuous frame extending between the first inner circumference and the first outer circumference.

16. The rechargeable battery as claimed in claim 1, wherein the vent plate includes a notch.

17. The rechargeable battery as claimed in claim 16, wherein the notch exposes the vent hole when an internal pressure of the rechargeable battery is higher than a threshold pressure.

18. The rechargeable battery as claimed in claim 1, wherein the member supports the vent plate.

19. A rechargeable battery, comprising:

A battery case surrounding an electrode assembly;

A cap plate having a vent hole, the cap plate being attached to the battery case;

A vent plate disposed above and covering the vent hole, the vent plate exposing the vent hole when an internal pressure of the rechargeable battery is higher than a threshold pressure; and A member protruding from an area of the cap plate surrounding the vent hole, the vent plate being seated on a surface of the member, with surface of the member is above the cap plate, without the vent plate being directly coupled with any surface of the cap plate, Wherein the member includes:

A first portion protruding from the area of the cap plate surrounding the vent hole having a first thickness; and A second portion protruding from the first portion, the second portion having a second thickness, wherein:

The first thickness is greater than the second thickness, and

Wherein the first portion and second portion form a continuous surface surrounding the vent hole, and the first portion and the second portion form a stepped portion along an outer side of the member.

20. The rechargeable battery as claimed in claim 19, wherein:

the vent plate covers at least a portion of a lateral side of the second portion, and the vent plate is in direct contact with the second portion.

* * * * *